United States Patent
Masuda et al.

(10) Patent No.: US 8,542,651 B2
(45) Date of Patent: Sep. 24, 2013

(54) COMMUNICATION CONTROL DEVICE AND COMMUNICATION CONTROL METHOD

(75) Inventors: Masafumi Masuda, Yokosuka (JP); Toyohiro Abe, Koutou-ku (JP); Takaaki Sato, Kawasaki (JP); Katsuhiko Yamagata, Fujisawa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 646 days.

(21) Appl. No.: 12/515,127

(22) PCT Filed: Nov. 16, 2007

(86) PCT No.: PCT/JP2007/072294
§ 371 (c)(1),
(2), (4) Date: Mar. 30, 2010

(87) PCT Pub. No.: WO2008/059963
PCT Pub. Date: May 22, 2008

(65) Prior Publication Data
US 2010/0226378 A1    Sep. 9, 2010

(30) Foreign Application Priority Data

Nov. 16, 2006 (JP) ................................ 2006-310086

(51) Int. Cl.
*H04W 4/00* (2009.01)
(52) U.S. Cl.
USPC ......... 370/331; 370/328; 455/435.2; 455/436
(58) Field of Classification Search
None
See application file for complete search history.

(56) References Cited

U.S. PATENT DOCUMENTS 7,035,636 B1 * 4/2006 Lim et al. ...................... 455/433
7,193,990 B2 * 3/2007 Lehtimaki et al. ............ 370/352
(Continued)

FOREIGN PATENT DOCUMENTS

JP    2002-185500 A    6/2002
JP    2003-18192 A    11/2003
(Continued)

OTHER PUBLICATIONS

3rd Generation Partnership Project; Technical Specification Group Radio Access Network; IP transport in UTRAN (Release 5), "3GPP TR 25.933", V5.4.0 (Dec. 2003), pp. 1-138.

(Continued)

*Primary Examiner* — Ayaz Sheikh
*Assistant Examiner* — Faiyazkhan Ghafoerkhan
(74) *Attorney, Agent, or Firm* — Crowell & Moring LLP

(57) ABSTRACT

In a communication system of a subscriber extension line system, there is provided a communication controller whereby the load of an unnecessary process to be applied on a communication controller relating to a destination of a mobile telephone is eliminated and the processing efficiency for communication control is enhanced. In a D-RNC which controls the communication of the mobile telephone and which is commonly connected with an S-RNC, the mobile telephone moves while maintaining the communication with the S-RNC. When the mobile telephone enters a cell relating to the D-RNC, the control data is transmitted or received between the S-RNC and the node for managing the mobile telephone. There are also provided: an IP address/UDP port number for RNSAP, reading/setting section 316 for acquiring an IP address identifying the S-RNC and an IP address identifying the node; an IP address/UDP port number for NBAP, reading/setting section 315; and an IP address/UDP port number exchange section 314 for notifying the other side of the S-RNC and the node of the acquired IP addresses, respectively. This allows a direct communication between the S-RNC and the node.

4 Claims, 7 Drawing Sheets

(56) References Cited

U.S. PATENT DOCUMENTS

| | | | |
|---|---|---|---|
| 7,346,023 B2* | 3/2008 | Chuah | 370/328 |
| 7,957,348 B1* | 6/2011 | Gallagher et al. | 370/331 |
| 2002/0064144 A1* | 5/2002 | Einola et al. | 370/335 |
| 2003/0076803 A1* | 4/2003 | Chuah | 370/338 |
| 2005/0141454 A1* | 6/2005 | Jain et al. | 370/331 |
| 2006/0080387 A1* | 4/2006 | Sipila et al. | 709/203 |

FOREIGN PATENT DOCUMENTS

| | | |
|---|---|---|
| JP | 2003-348661 A | 12/2003 |
| JP | 2004-260620 A | 9/2004 |
| WO | WO 01/72057 A2 | 9/2001 |
| WO | WO 2005/115026 A2 | 12/2005 |

OTHER PUBLICATIONS

3rd Generation Partnership Project; Technical Specification Group Services and System Aspects; Technical Specifications and Technical Reports for a UTRAN-based 3GPP system (Release 1999), "3GPP TS 21.101", V3.17.0 (Dec. 2007), pp. 1-16.
PCT/JP2007/072294 PCT/ISA/210 International Search Report.
PCT/JP2007/072294 Translation of PCT/ISA/237.
PCT/JP2007/072294 PCT/IB/338.
PCT/JP2007/072294 PCT/IB/373.
European Search Report dated Jun. 3, 2013 (Nine (9) pages).

* cited by examiner

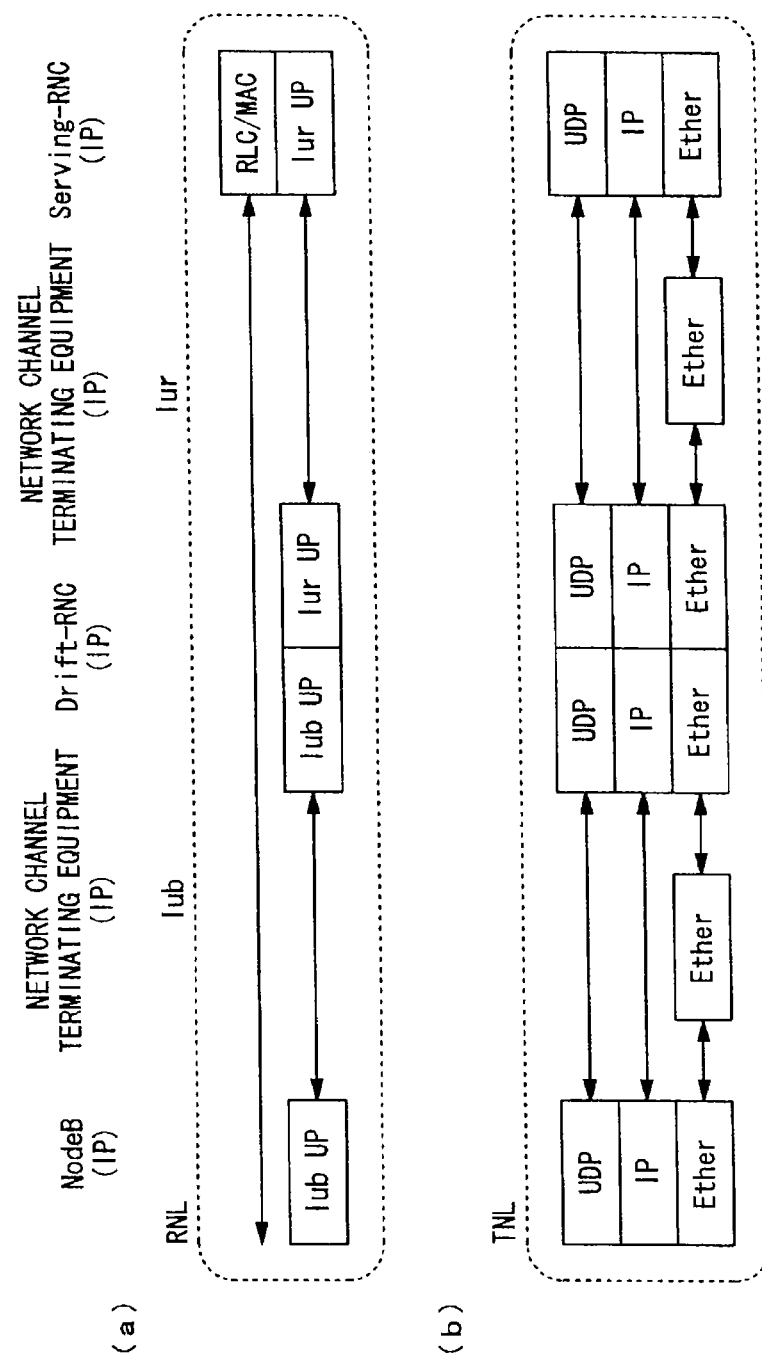

COMMUNICATION CONTROL DEVICE AND COMMUNICATION CONTROL METHOD

TECHNICAL FIELD

The present invention relates to communication controllers and communication controlling methods, and more specifically, to a communication controller and a communication controlling method in which communication is performed by use of a subscriber line extension method.

BACKGROUND ART

In these days, various types of communication controllers are proposed in order to control communication of movable communication terminal devices such as mobile telephones. In such a communication controller, a communication system of global standard such as W-CDMA (Wide band Code Division Multiple Access) or UMTS (Universal Mobile Telecommunications System) is applied. According to the above communication system, a single frequency bandwidth is shared by multiple users by multiplexing codes, whereby the frequency efficiency is excellent and high-speed communication is made available in a flexible manner by selecting the code.

Such a conventional communication system is described in Non-Patent Document 1. The TNL (Transport Network Layer) used as an interface of the W-CDMA system is limited to ATM (Asynchronous Transfer Mode) in its original release, whereas Non-Patent Document 2 describes a technique applied as an option of the IP (Internet Protocol) Transport.

Generally, in the above communication system, a controller gives controls related to radio communication of a mobile telephone via a base transceiver station, so as to control the communication in a cell to be covered by the controller itself. ATM and IT transport have different control systems in information transmission in a network including, for example, between the controller and the base transceiver station. When the mobile telephone, which started radio communication in a cell controlled by a controller, moves to another cell while maintaining the communication, the mobile telephone has to be controlled by transmitting information between the controllers. Any one of ATM and IP Transport is employed for controlling the information transmission between the controllers.

That is to say, the controller that started the radio communication transmits information on the mobile telephone and for the communication control to the controller controlling the destination cell. In the destination cell, whether or not the start of communication is permitted is determined according to the congestion state. When the start of communication is permitted, the communication also continues subsequent to the movement. After that, the radio communication is continuously controlled by the controller of the source cell. The controller of the destination cell merely serves a role of relaying information between the controller of the source cell and the mobile telephone or the base transceiver station. This eliminates the takeover of control information or communication information from the controller of the source cell to the controller of the destination cell. This technique is referred to as subscriber line extension method.

In ATM Transport, ATM protocols are used for information transmission between the radio network controllers in the subscriber line extension method, whereas in IP Transport, IP protocols are used for information transmission.

Non-Patent Document 1: 3GPP Technical Standard TS21.101

Non-Patent Document 2: 3GPP Technical Report TR25.933

Problems to be Solved by the Invention

Meanwhile, according to the above-described subscriber line extension method, data from the mobile telephone that has received radio communication is transmitted to the controller for controlling the destination cell via the base transceiver station, and is then transferred to the controller that has received the radio communication. Thus transferred data in the above manner is referred to as user information transfer plane (U-plane). Likewise, a control signal for controlling the radio communication between the controller and the base transceiver station is also transmitted from the base transceiver station to the controller controlling the destination cell, and is then transferred to the controller that has received the radio communication. Thus transferred data in the above manner is referred to as call control signal plane (C-plane). In a conventional subscriber line extension method, both of C-plane and U-plane are transmitted from the base transceiver station to the controller of the destination cell, and are then transmitted to the controller that has received the radio communication.

It is to be noted that C-plane is needed to be transmitted to the controller of the destination cell for the communication control, whereas U-plane does not affect the communication at all by being transmitted to the controller. Hence, the controller of the destination cell is subjected to a load of transmitting or receiving data unnecessary for processing, thereby wasting time and power available to any other necessary processes.

In general, U-plane has a data amount greater than C-plane, thereby further increasing the load of the unnecessary process applied to the controller.

The present invention has been made in view of the above circumstances, and provides a communication controller and a communication controlling method, thereby eliminating a load for unnecessary processing applied to the controller of a destination cell of a mobile telephone and enhancing the processing efficiency in the communication control, in a communication system that employs a subscriber line extension method that utilizes IP Transport.

Means for Solving the Problems

According to an aspect of the present invention, there is provided a communication controller, which is connected to a mobile switching center with another communication controller, and which controls communication of a movable communication terminal device, the communication controller including: unique information acquiring means for, when the communication terminal device moves, while maintaining communication with a first communication controller, from a first communication control range of the first communication controller and enters a second communication control range of a second communication controller, transmitting or receiving control data for controlling the communication between the first communication controller and a node managing the second communication control range to which the communication terminal device moves so as to acquire first unique information identifying the first communication controller and node unique information identifying the node; and unique information exchanging means for notifying the node of the first unique information, identifying the first communication controller, which has been acquired by the unique information acquiring means, and simultaneously notifying the first communication controller of the node unique information, identifying the node, which has been acquired by the unique information acquiring means, wherein the first unique information and the node unique information that have been notified by the unique information exchanging means allows user data that should be controlled to be communicated directly between the first communication controller and the node. Accordingly, this allows the first communication controller and the node to identify each other with the unique information, thereby permitting direct communication.

In the above-described configuration, the unique information exchanging means of the second communication controller may exchange the first unique information of the first communication controller and the node unique information of the node. It is therefore possible to achieve the configuration suited to reduce the load of the D-RNC in the subscriber line extension method.

In the above-described configuration, the first communication controller and the node may communicate the user data by use of a connectionless protocol, and the first unique information and the node unique information may be either an IP address or a UDP port number. With such an aspect of the present invention, the direct communication between the first communication controller and the node is achieved in a relatively easy manner. Accordingly, this allows the first communication controller and the node to identify each other with the unique information, thereby permitting direct communication.

According to another aspect of the present invention, there is provided a communication controlling method to be applied to a communication controller, which is connected to a mobile switching center with another communication controller, and which controls communication of a movable communication terminal device, the communication controlling method including: a unique information acquiring step for, when the communication terminal device moves, while maintaining communication with a first communication controller, from a first communication control range of the first communication controller and enters a second communication control range of a second communication controller, transmitting or receiving control data for controlling communication between the first communication controller and a node managing the second communication control range to which the communication terminal device moves to acquire first unique information identifying the first communication controller and node unique information identifying the node; and a unique information exchanging step for notifying the node of the first unique information, identifying the first communication controller, which has been acquired by the unique information acquiring step, and simultaneously notifying the first communication controller of the node unique information, identifying the node, which has been acquired by the unique information acquiring step, wherein the first unique information and the node unique information that have been notified by the unique information exchanging step allow user data that should be controlled to be communicated directly between the first communication controller and the node.

Accordingly, this allows the first communication controller and the node to identify each other with the unique information, thereby permitting direct communication.

According to an aspect of the present invention, in the communication system that employs a subscriber line extension method, it is possible to provide a communication controller and a communication controlling method, thereby eliminating the loads for unnecessary processes applied on the controller for the destination cell of the mobile telephone and improving the processing efficiency in the control.

BRIEF DESCRIPTION OF THE DRAWINGS

FIG. 7 illustrates protocol stacks relating to the conventional U-plane to be compared with FIG. 5.

Figure 1:
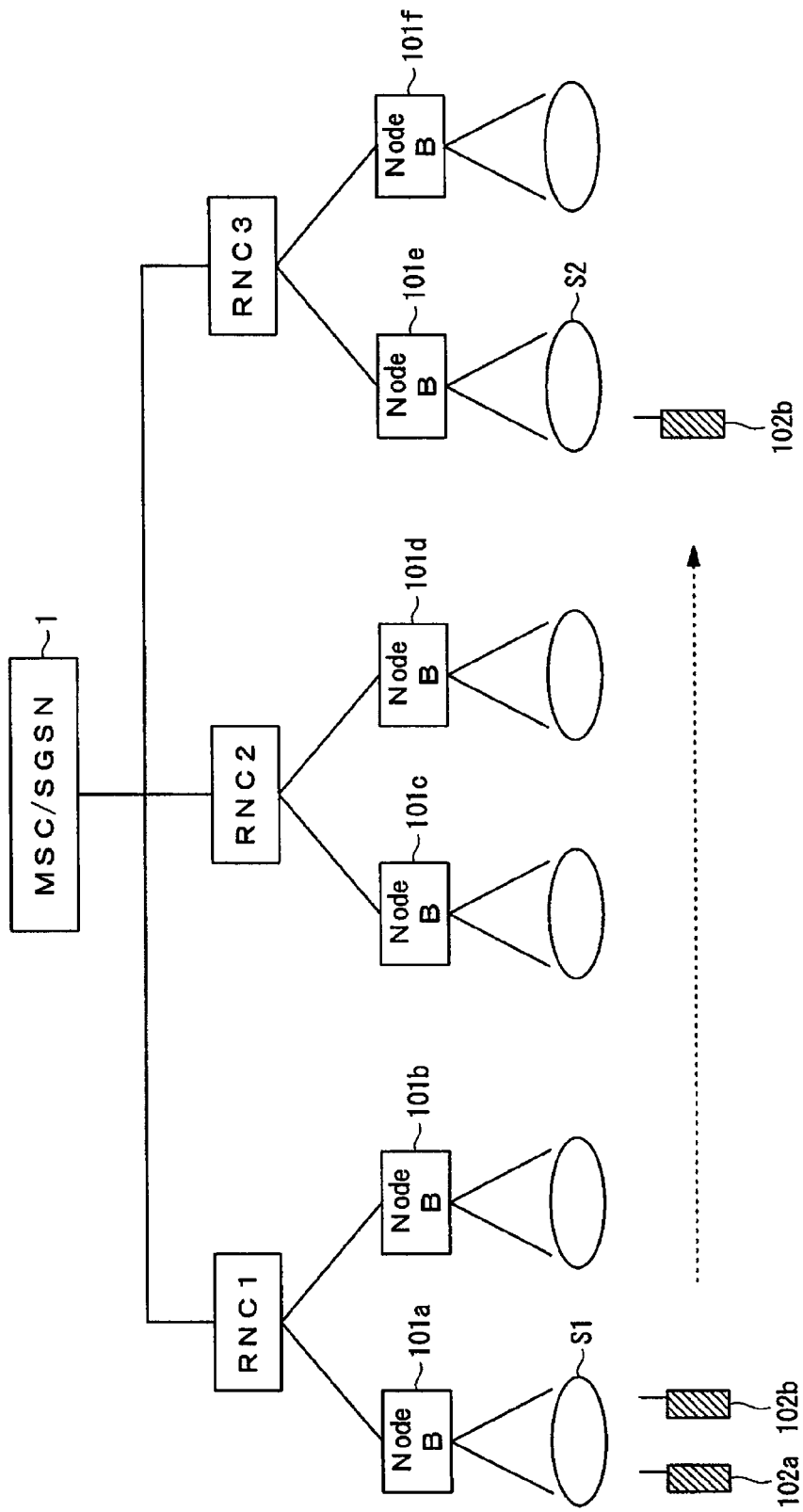
FIG. 1 illustrates a communication system to which a communication controller according to an aspect of the present invention is applied.

EXPLANATION OF REFERENCES 1, 2 MSC/SGSN, 101a-101f, 203 NodeB
102a, 102b, 204 Mobile telephone
201 S-RNC, 202 D-RNC
301 C-plane processor, 302 U-plane processor
311 RNSAP signal transmitting/receiving section, 312 signal analyzing section
313 NBAP signal transmitting/receiving section, 314 IP address/UDP port number exchange section
315 IP address/UDP port number for NBAP, reading/setting section
316 IP address/UDP port number for RNSAP, reading/setting section
317 Iub-side UDP/IP transmitting/receiving section
318 IubUP transmitting/receiving section, 319 IurUP transmitting/receiving section
320 Iur-side UDP/IP transmitting/receiving section

BEST MODE FOR CARRYING OUT THE INVENTION

A communication controller and a communication controlling method according to an embodiment of the present invention will now be described with reference to the accompanying drawings.

(Fundamental Technique)

Firstly, in order to facilitate the understanding of the present invention, the subscriber line extension system will be described. FIG. 1 illustrates a communication system to which a communication controller according to the present embodiment is applied. The illustrated communication system includes: an MSC/SGSN (Mobile Switching Center/ Serving GPRS Support Node); RNC (Radio Network Controller) 1; RNC 2; RNC 3 connected to the MSC/SGSN 1; radio base transceiver stations that are a NodeB 101a to a NodeB 101f and that are controlled by RNC 1, RNC 2, and RNC 3, respectively; and UEs (User Equipment) that are mobile stations within a range of a cell S managed by the NodeB 101a to the NodeB 101f. The UEs according to the present embodiment are assumed to be mobile telephones 102a and 102b.

In a cell S1 (first communication control range), the mobile telephone 102b requests a start of radio communication to the RNC 1 (first communication controller) via the NodeB 101a, and starts communication with the mobile telephone 102a. Then, it is assumed that the mobile telephone 102b moves to a cell S2 (second communication control range), while maintaining the communication. In this case, according to the subscriber line extension system for IP Transport, the RNC 1 continuously holds information on the communication of the mobile telephone 102b. The NodeB 101e in the cell S2 manages only the communication state in the cell S2.

Such RNC 1 is also referred to as fixed RNC or anchor. In a system where an RNC to be used for communication moves in accordance with the movement of the mobile telephone 102b, the fixed RNC is referred to as S (Serving)-RNC, whereas a moving RNC is referred to as D (Drift)-RNC.

The mobile telephone 102b transmits a signal to the RNC 3 via the NodeB 101e, so the transmitted signal is transferred from the RNC 3 to the RNC 1.

Since the communication with the subscriber line extension system eliminates the process of transmitting all the information relating to the communication held by the RNC 1, it is considered that a load applied to the process be small, as compared to the subscriber line extension system that has been discussed as the conventional technique.

As will be described below, the communication controller according to an aspect of the present invention is capable of further reducing the load of unnecessary signal processing applied to the D-RNC, in the above-described subscriber line extension system.

(System Configuration)

Figure 2:
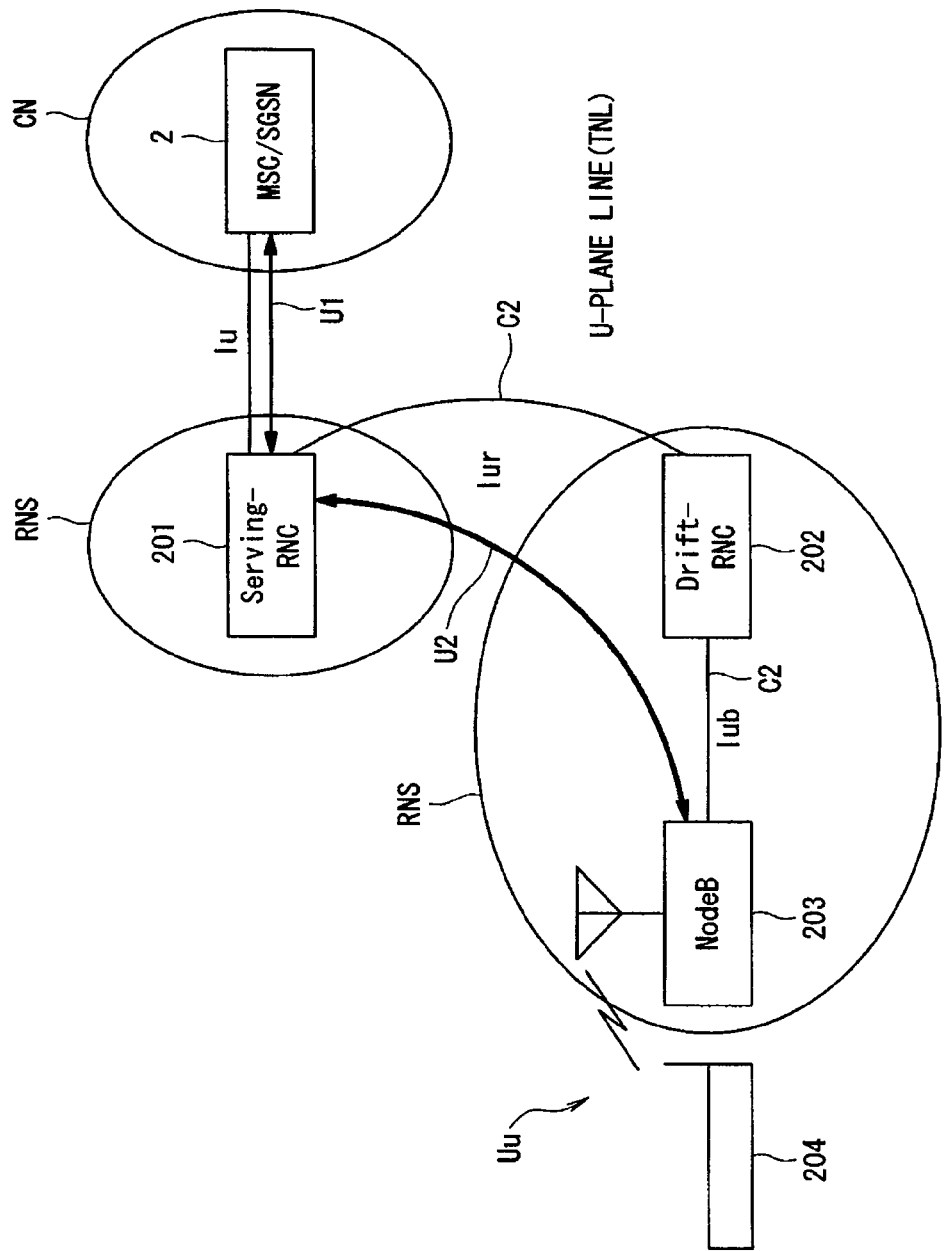
FIG. 2 illustrates a system of W-CDMA system in which a communication controller and a communication controlling method according to an aspect of the present invention is applied.

FIG. 2 illustrates a system of W-CDMA in which a communication controller and a communication controlling method according to the present embodiment is applied. The system includes: a MSC/SGSN 2; an RNC serving as an S-RNC 201; an RNC serving as a D-RNC 202; a NodeB 203 controlled by the D-RNC 202; and a mobile telephone 204 within a range of a cell managed by the NodeB 203.

Each unit of nodes including the RNCs and the NodeB arranged under the RNC is referred to as RNS (Radio Network Subsystem). Such a system is known as UTRAN (UMTS Terrestrial Radio Access Network).

In a UTRAN, the S-RNC 201 is established as an anchor, and then a mobile telephone 204 is remotely controlled via the D-RNC 202 and the NodeB 203. This control denotes the subscriber line extension system according to the present embodiment. In addition, a system on the mobile switching center side including the MSC/SGSN 2 is referred to as CN (Core Network).

"Uu" represents the interface between the mobile telephone and the UTRAN. "Iub" represents the interface between the NodeB 203 and the RNC. "Iur" represents the interface between the RNCs in the subscriber line extension.

According to the present embodiment, a communication line "u1" is established for communication between the MSC/SGSN 2 and the S-RNC 201. The signal that has been received by the S-RNC 201 via the communication line "u1" is transmitted over a communication line "c2" via the D-RNC 202 or a communication line "u2" to the NodeB 203 directly.

(Configuration of Communication Controller)

In the above-described communication system, the communication controller as either the S-RNC 201 or the D-RNC 202 according to the present embodiment is connected to the MSC/SGSN 2 with another RNC, so as to control communication of movable mobile telephones. The S-RNC 201 and the D-RNC 202 have similar configurations, and are capable of operating as either of the S-RNC 201 or the D-RNC 202 in accordance with the communication state of the mobile telephone controlled by the S-RNC 201 or the D-RNC 202 itself. It is to be understood that the characteristic operation of the communication controller according to the present embodiment is performed in a case where the communication controller functions as the D-RNC 202.

The D-RNC 202 is provided with functionalities of the communication controller according to the present embodiment, thereby achieving a system suited for the subscriber line extension system in the present embodiment.

Figure 3:
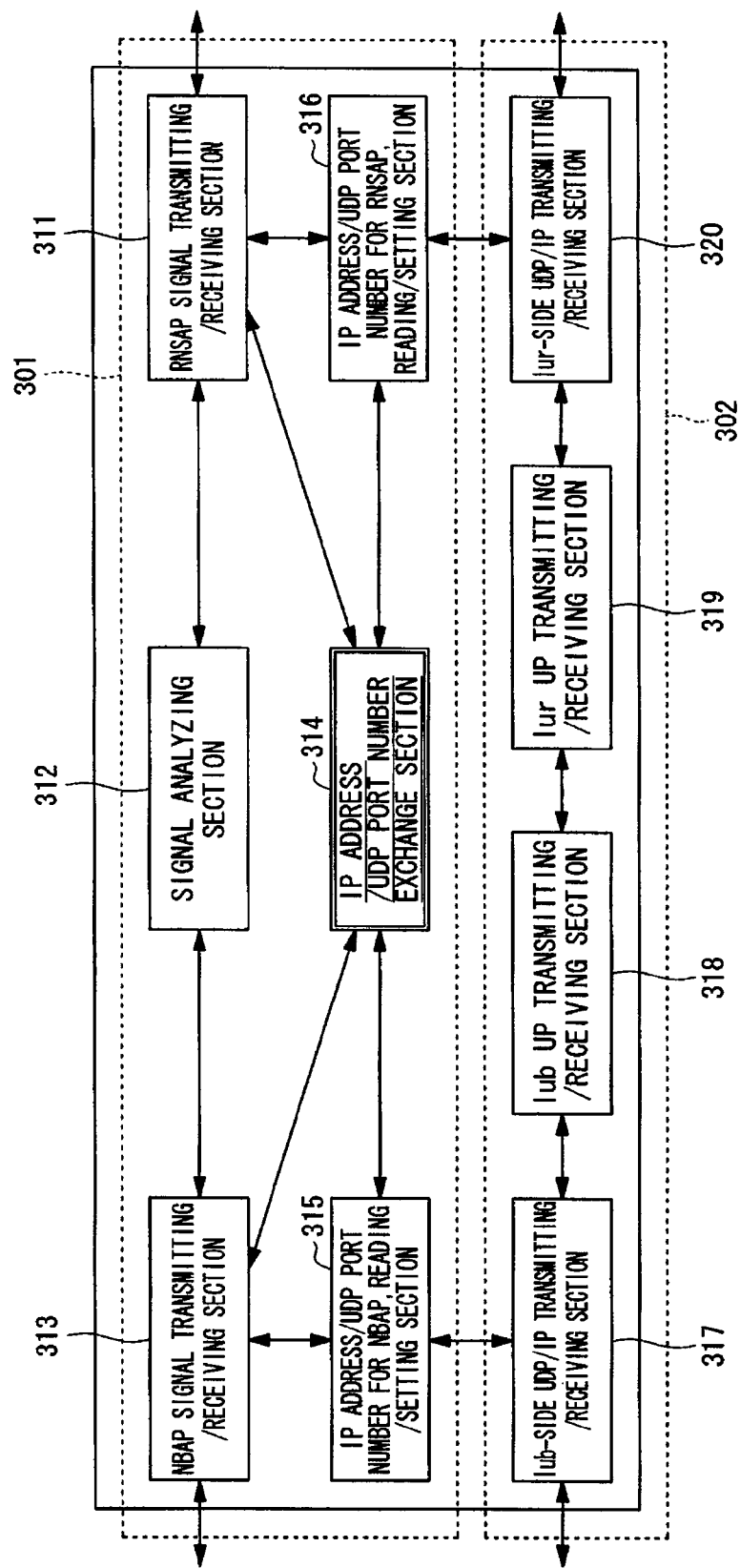
FIG. 3 illustrates the configuration of the communication controller according to an aspect of the present invention.

FIG. 3 illustrates the configuration of the communication controller according to the present embodiment. However, for simplification of the description, the configuration of the D-RNC 202 is illustrated. The D-RNC 202 is provided with a C-plane processor 301 and a U-plane processor 302. C-plane is a call controlling signal plane that is necessary for communication control. Likewise, U-plane is user data generated by a user to be controlled by the C-plane.

The C-plane processor 301 is provided with: an RNSAP (Radio Network Subsystem Application Part) signal transmitting/receiving section 311 for transmitting or receiving radio network signals over the "Iur"; an NBAP (Node B Application Protocol) signal transmitting/receiving section 313 for transmitting or receiving protocol signals for the NodeB 203; and a signal analyzing section 312 for analyzing the signal received at the RNSAP signal transmitting/receiving section 311 and the NBAP signal transmitting/receiving section 313. The C-plane processor 301 is also provided with: an IP address/UDP port number for RNSAP, reading/setting section 316, for extracting unique information of the S-RNC included in the analyzed signal; and an IP address/UDP port number for NBAP, reading/setting section 315, for extracting unique information of the NodeB 203.

According to the present embodiment, IP addresses of the S-RNC 201 and the NodeB 203 are used as the unique information. However, the unique information is not limited to IP address, and may be a UDP port number.

In addition, the C-plane processor 301 is provided with an IP address/UDP port number exchange section 314, which notifies the NodeB 203 of the IP address of the S-RNC 201 that has been extracted by the IP address/UDP port number for RNSAP, reading/setting section 316, via the NBAP signal transmitting/receiving section 313, and which simultaneously notifies the S-RNC 201 of the IP address that has been extracted by the IP address/UDP port number for NBAP, reading/setting section 315 via the RNSAP signal transmitting/receiving section 311.

The mobile telephone 204 moves maintaining the communication with the S-RNC 201. When the mobile telephone 204 moves out of the cell controlled by the S-RNC 201 and enters a communication control range of the D-RNC 202, the RNSAP signal transmitting/receiving section 311 and the NBAP signal transmitting/receiving section 313 of the C-plane processor 301 transmits or receives the C-Plane for controlling communication between the S-RNC 201 and the NodeB 203. Then, the IP address of the S-RNC 201 and the IP address of the NodeB 203 are acquired from the signal analysis result of the signal analyzing section 312.

The C-plane processor 301 notifies the NodeB 203 and the S-RNC 201 of the acquired IP address of the S-RNC 201 and the IP address of the NodeB 203, respectively, by means of the IP address/UDP port number exchange section 314.

With such a configuration, the NodeB 203 is capable of learning the IP address of the S-RNC 201. Meanwhile, the S-RNC 201 is capable of learning the IP address of the NodeB 203. For this reason, the NodeB 203 and the S-RNC 201 learn the IP address of each other, thereby allowing user data to be communicated with the use of connectionless protocols such as UDP (User Datagram Protocol) or IP (Internet Protocol).

In the above configuration, the IP address/UDP port number for RNSAP, reading/setting section 316 and the IP address/UDP port number for NBAP, reading/setting section 315 serve as unique information acquiring means according to the present embodiment. Also, the IP address/UDP port number exchange section 314 serves as unique information exchange means according to the present embodiment.

The U-plane processor 302 is utilized when the D-RNC 202 functions as the S-RNC 201 and transmits or receives U-plane directly with the NodeB 203, but is not utilized when the D-RNC 202 functions as the D-RNC 202. The S-RNC 201 and the D-RNC 202, each are provided with a switch, not shown, for setting whether or not the U-plane processor 302 is made to be operated.

The U-plane processor 302 is provided with: a Iur-side UDP/IP transmitting/receiving section 320; a Iub-side UDP/IP transmitting/receiving section 317; a IurUP transmitting/receiving section 319 for transmitting or receiving the U-plane from the Iur side by use of the received IP address; and a IubUP transmitting/receiving section 318 for transmitting or receiving the U-plane from the Iub side.

(Operation of Communication Controller)

The operation of the communication controller that has been discussed above will be described in more detail.

Figure 4:
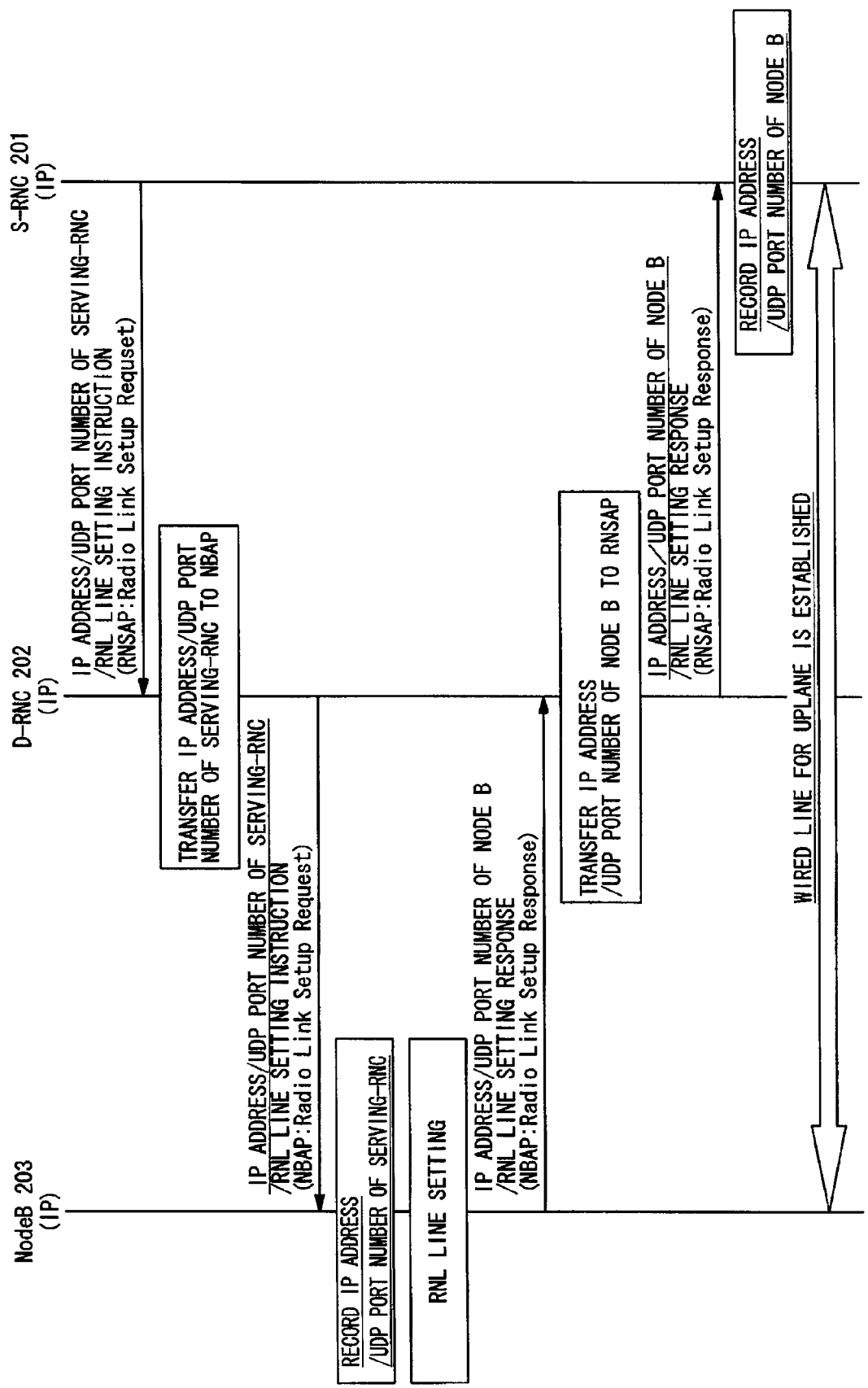
FIG. 4 is a timing chart representing the operation of the communication controller according to an aspect of the present invention.

FIG. 4 is a timing chart representing the operation of the communication controller according to the present embodiment, and also describes a communication controlling method according to the present embodiment. As illustrated, the D-RNC 202 receives an RNSAP line setting signal from the S-RNC 201, by means of the RNSAP signal transmitting/receiving section 311. The RNSAP line setting signal is a signal for instructing the line setting of the RNSAP signal. The RNSAP line setting signal includes the IP address of the S-RNC 201.

In accordance with the instruction, in the D-RNC 202, the IP address/UDP port number exchange section 314 operates and passes the RNSAP signal to the IP address/UDP port number for NBAP, reading/setting section 315. The IP address/UDP port number for NBAP, reading/setting section 315 extracts the IP address of the S-RNC 201 (unique information acquiring step), and passes the extracted IP address to the NEAP signal transmitting/receiving section 313. The NEAP signal transmitting/receiving section 313 generates an NBAP line setting signal, including the IP address, for the NodeB 203, and then transmits the signal to the NodeB 203 (unique information exchanging step).

In receipt of the NBAP line setting signal from the NodeB 203, the IP address/UDP port number exchange section 314 passes the NBAP line setting signal to the IP address/UDP port number for RNSAP, reading/setting section 316. The IP address/UDP port number for RNSAP, reading/setting section 316 extracts the IP address of the NodeB 203 (unique information acquiring step), and then passes the extracted IP address to the RNSAP signal transmitting/receiving section 311.

The RNSAP signal transmitting/receiving section 311 generates an RNSAP line setting signal, including the IP address, for the S-RNC 201, and then transmits the signal to the S-RNC 201 (unique information exchanging step).

With the operation described heretofore, according to the present embodiment, a wired circuit for the U-plane is established between the S-RNC 201 and the NodeB 203 to enable direct communication therebetween, without causing U-plane over Iub/Iur to pass through the D-RNC 202.

In addition, when the operation mode of the D-RNC 202 is changed by the switch described above, the D-RNC 202 is capable of functioning as an S-RNC 201 that receives U-plane. In this case, the IP address/UDP port number exchange section 314 does not operate.

Furthermore, when the D-RNC 202 functions as the S-RNC 201, the IP address/UDP port number for NBAP, reading/setting section 315 generates an NBAP line setting signal including the IP address that has been read out of the Iub-side UDP/IP transmitting/receiving section 317. Thus generated signal is transmitted to the NodeB 203 by the NBAP signal transmitting/receiving section 313. When a reply signal for replying the NBAP line setting signal is received, the IP address read out of this signal is set at the Iub-side UDP/IP transmitting/receiving section 317.

Likewise, the above operation is performed on the Iur-side RNSAP signal. According to the present embodiment described above, the RNC serving as the S-RNC 201 is capable of transmitting or receiving U-plane over Iub/Iur by way of the D-RNC 202.

(Effects Obtainable According to the Present Embodiment)

The effects obtainable according to the communication controller and communication controlling method, described heretofore, will now be discussed as compared to a conventional technique.

Figure 5:
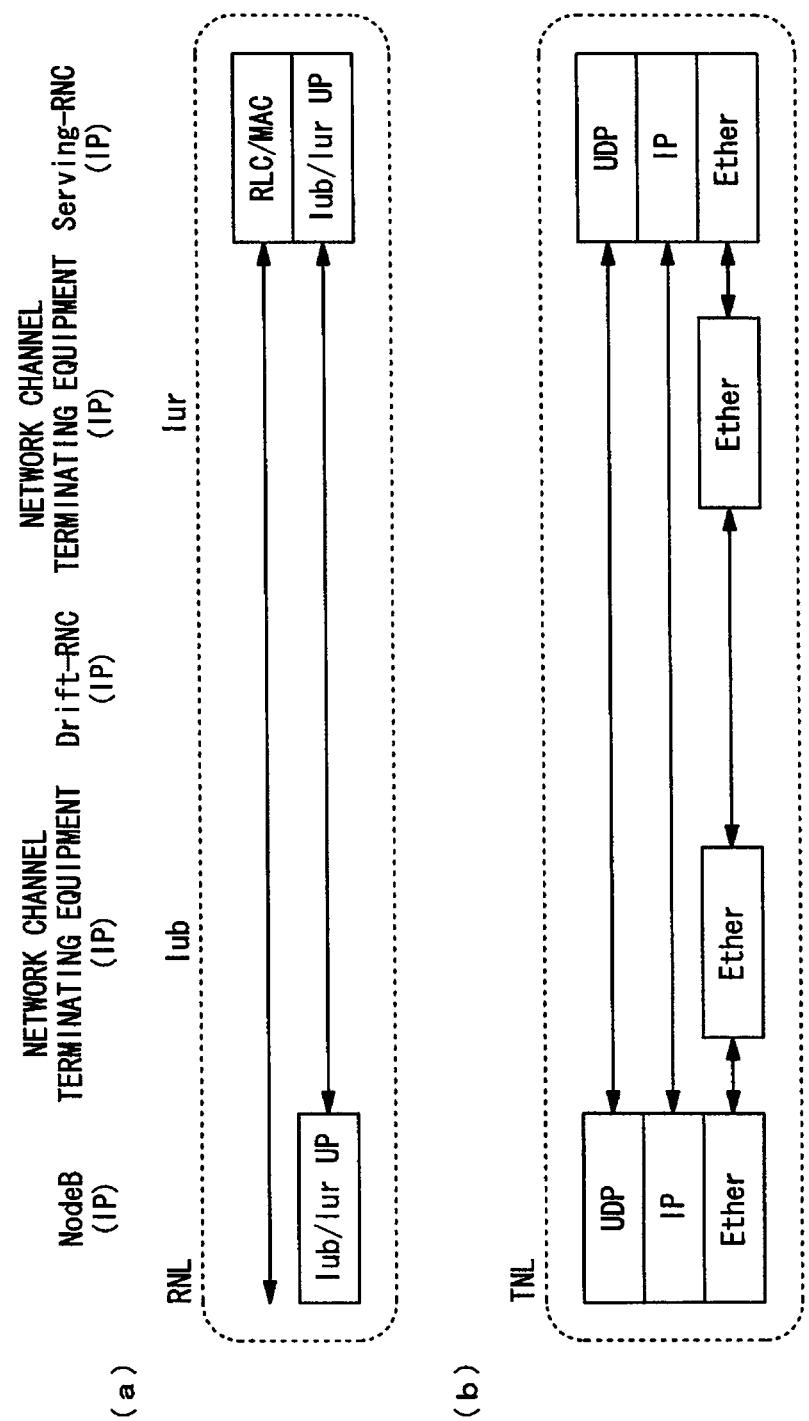
FIG. 5 illustrates protocol stacks of U-plane over Iub/Iur according to an aspect of the present invention.

FIG. 5 illustrates protocol stacks of U-plane over Iub/Iur according to the present embodiment. FIG. 5A illustrates protocol stacks of radio transmission RNL (Radio Network Layer). FIG. 5B illustrates protocol stacks of Transport layer TNL. The line setting protocols over Iub/Iur are referred to as NBAP/RSNAP, respectively and are commonly used, even if TNL is an ATM-based or IP-based network.

NBAP/RSNAP is terminated by an RNC or a NodeB, but is not terminated by Network Channel Terminating Equipment (such as router or switch in an IP-based network). As illustrated, in an RNL, it is possible to directly communicate U-plane between the NodeB 203 and the S-RNC 201 by use of a Iub/Iur interface. In a TNL, communication is enabled without the intervention of the D-RNC 202, by use of UDP, IP, or Ether connection protocols.

Figure 6:
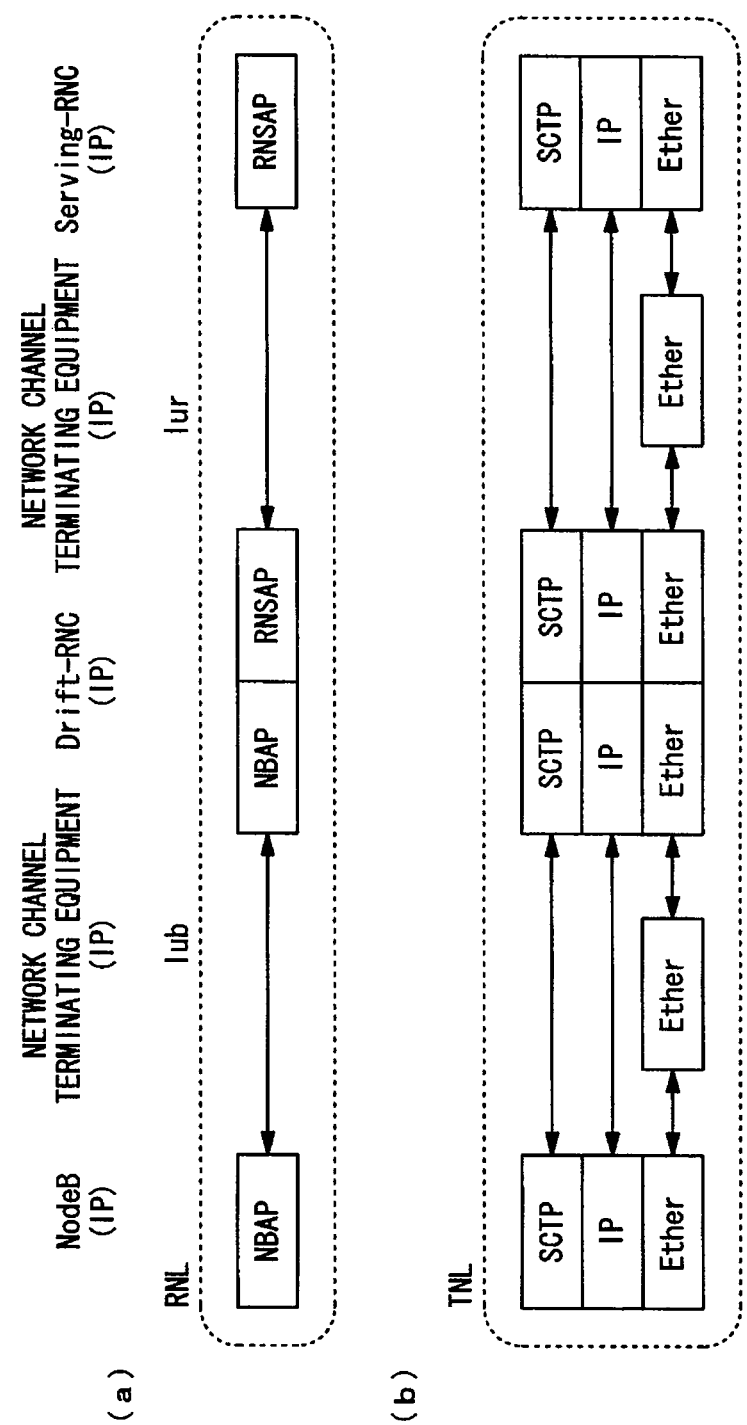
FIG. 6 illustrates protocol stacks of C-plane over Iub/Iur according to an aspect of the present invention.

The configuration according to the present embodiment is applied to U-plane only. As to C-plane, transmission or reception is performed by use of protocols of NEAP for a NodeB and RNSAP for Iur, as illustrated in FIG. 6. In a TNL, C-plane is transmitted or received via the S-RNC 201 by use of SCTP (stream control transmission protocol) that is a protocol for controlling telephone networks.

FIG. 7 illustrates protocol stacks relating to the conventional U-plane for comparing the protocol stacks that have been illustrated in FIG. 5. As illustrated, according to the conventional technique, U-plane is necessary to be transmitted or received via the D-RNC 202 in any one layer of RNL and TNL.

As discussed heretofore, according to the present embodiment, U-plane out of communication data is allowed to be transmitted or received directly between the S-RNC 201 and the NodeB 203 without the intervention of the D-RNC 202. Since no technical significance can be found in the transmission or reception of U-plane to or from the NodeB 203 via the D-RNC 202, the transmission or reception of U-plane is considered for the D-RNC 202 to be an unnecessary process.

According to an aspect of the present invention, such a technical characteristic is focused on. In the D-RNC 202, the IP addresses or UDP port numbers of the D-RNC 202 and the NodeB 203 are exchanged, thereby achieving connectionless communication between the S-RNC 201 and the NodeB 203. Accordingly, as to U-plane, direct transmission or reception between the S-RNC 201 and the NodeB 203 is made possible, thereby reducing the load applied to the U-plane processor 302 of the D-RNC 202.

In addition, the load for an unnecessary process is reduced. It is therefore possible to provide a communication controller, whereby the capabilities of a CPU or the like to be utilized for necessary processes are increased and its processing efficiency is excellent, or to provide a communication controlling method whereby the processing efficiency of the communication controller is enhanced.

INDUSTRIAL APPLICABILITY

The present invention is available to the control of a movable communication terminal device to be controlled by a communication system that employs a subscriber line extension system, and in particular, is suited for a communication system where it is believed that the communication terminal device frequently moves to another cell area while maintaining communication.

The invention claimed is:

1. A communication controller, which is connected to a mobile switching center with another communication controller, and which controls communication of a movable communication terminal device, the communication controller comprising:

a unique information acquiring unit configured to, when the communication terminal device moves from a first communication control range of the first communication controller and enters a second communication control range of a second communication controller, while the communication terminal device is maintaining communication with the first communication controller, transmit or receive control data for controlling communication of the communication terminal device between the first communication controller for controlling the communication of the communication terminal device in the first communication control range before movement and a destination node for managing the second communication control range where the communication terminal device is located after movement so as to extract from the control data first communication controller unique information identifying the first communication controller and destination node unique information identifying the destination node for managing the second communication control range where the communication terminal device is located after movement; and a unique information exchanging unit configured to notify the destination node of the first communication controller unique information identifying the first communication controller for controlling the communication of the communication terminal device in the first communication control range before movement, extracted from the control data by the unique information acquiring unit, and simultaneously notify the first communication controller of the destination node unique information identifying the destination node for managing the second communication control range where the communication terminal device is located after movement, extracted from the control data by the unique information acquiring unit so as to exchange the first communication controller unique information and the destination node unique information, wherein while the first communication controller unique information is notified to the destination node via the unique information exchanging unit and the destination node unique information is notified to the first communication controller via the unique information exchanging unit so as to exchange the first communication controller unique information and the destination node unique information, user data which is different from the control data, is controlled by the control data, and is User-plane generated by a user of the communication terminal device, is transmitted and received directly between the first communication controller for controlling the communication of the communication terminal device in the first communication control range before movement and the destination node for managing the second communication control range where the communication terminal device is located after movement, without intervention of the unique information exchanging unit.

2. The communication controller according to claim 1, wherein a unique information exchanging unit of the second communication controller exchanges the unique information of the first communication controller and unique information of the destination node.

3. The communication controller according to claim 1,
wherein the first communication controller and the destination node communicate the user data by use of a connectionless protocol, and
wherein the unique information is either an Internet Protocol (IP) address or a User Datagram Protocol (UDP) port number.

4. A communication controlling method to be applied to a communication controller, which is connected to a mobile switching center with another communication controller, and which controls communication of a movable communication terminal device, the communication controlling method comprising the steps of:

when the communication terminal device moves from a first communication control range of the first communication controller and enters a second communication control range of a second communication controller, while the communication terminal device is maintaining communication with the first communication controller, transmitting or receiving, by a unique information acquiring unit, control data for controlling communication of the communication terminal device between the first communication controller for controlling the communication of the communication terminal device in the first communication control range before movement and a destination node for managing the second communication control range where the communication terminal device is located after movement so as to extract from the control data first communication controller unique information identifying the first communication controller and destination node unique information identifying the destination node for managing the second communication control range where the communication terminal device is located after movement; and notifying, by a unique information exchanging unit, the destination node of the first communication controller unique information identifying the first communication controller for controlling the communication of the communication terminal device in the first communication control range before movement, extracted from the control data at the transmitting or receiving step, and simultaneously notifying the first communication controller of the destination node unique information identifying the destination node for managing the second communication control range where the communication terminal device is located after movement, extracted from the control data at the transmitting or receiving step, so as to exchange the first communication controller unique information and the destination node unique information, wherein while the first communication controller unique information is notified to the destination node at the notifying step and the destination node unique information is notified to the first communication controller via the unique information exchanging unit so as to exchange the first communication controller unique information and the destination node unique information, user data which is different from the control data, is controlled by the control data, and is User-plane generated by a user of the communication terminal device, is transmitted and received directly between the first communication controller for controlling the communication of the communication terminal device in the first communication control range before movement and the destination node for managing the second communication control range where the communication terminal device is located after movement, without intervention of the unique information exchanging unit.

* * * * *